(12) United States Patent
Nagai et al.

(10) Patent No.: US 11,995,499 B2
(45) Date of Patent: May 28, 2024

(54) IC CARD AND IC CARD SYSTEM

(71) Applicant: Murata Manufacturing Co., Ltd., Kyoto-fu (JP)

(72) Inventors: Takahiro Nagai, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 17/818,530

(22) Filed: Aug. 9, 2022

(65) Prior Publication Data

US 2022/0383004 A1 Dec. 1, 2022

Related U.S. Application Data

(63) Continuation of application No. PCT/JP2020/034468, filed on Sep. 11, 2020.

(30) Foreign Application Priority Data

Feb. 13, 2020 (JP) .................................. 2020-022070

(51) Int. Cl.
*G06K 19/06* (2006.01)
*G06K 7/10* (2006.01)
(Continued)

(52) U.S. Cl.
CPC ..... *G06K 7/10297* (2013.01); *G06K 19/0704* (2013.01); *G06K 19/07354* (2013.01); *H02J 50/10* (2016.02); *H02J 50/90* (2016.02)

(58) Field of Classification Search
CPC ........... G06K 19/0723; G06K 7/10297; G06K 19/077; G06K 19/07749; G06K 19/07775;
(Continued)

(56) References Cited

U.S. PATENT DOCUMENTS 10,546,281 B2 * 1/2020 Sako ..................... H01F 38/14
2010/0213770 A1 * 8/2010 Kikuchi ................ H01Q 1/248
307/104
(Continued)

FOREIGN PATENT DOCUMENTS

JP H10-307898 A 11/1998
JP 2005-050130 A 2/2005
(Continued)

OTHER PUBLICATIONS

International Search Report issued in PCT/JP2020/034468; dated Dec. 1, 2020.

*Primary Examiner* — Daniel St Cyr
(74) *Attorney, Agent, or Firm* — Studebaker & Brackett PC

(57) ABSTRACT

An IC card communicates with a reader/writer, which is inductive read/write communication equipment, in a non-contact manner. The IC card includes a proximity detection circuit that detects a proximity state to the reader/writer, a near-field communication circuit, an electronic function circuit, an electricity storage device, and a power supply control circuit. The power supply control circuit controls, based on a detection result of the proximity detection circuit, power supply from the electricity storage device to the electronic function circuit. The IC card manages and controls presence/absence and timing of power supply from the electricity storage device to the electronic function circuit and effectively controls discharging of the electricity storage device and charging of the electricity storage device.

20 Claims, 8 Drawing Sheets

(51) Int. Cl.
*G06K 19/07* (2006.01)
*G06K 19/073* (2006.01)
*H02J 50/10* (2016.01)
*H02J 50/90* (2016.01)

(58) Field of Classification Search
CPC ...... G06K 7/10316; H02J 50/80; H02J 50/90; H02J 50/10
USPC ........................................ 235/492, 487, 451
See application file for complete search history.

(56) References Cited

U.S. PATENT DOCUMENTS

| | | | |
|---|---|---|---|
| 2017/0170691 A1* | 6/2017 | Kim | ........................ H02J 50/20 |
| 2020/0044482 A1* | 2/2020 | Partovi | ................ H02J 7/0047 |
| 2021/0271838 A1* | 9/2021 | Nishi | ............... G06K 19/06028 |
| 2021/0408827 A1* | 12/2021 | Partovi | ................ H02J 7/0013 |

FOREIGN PATENT DOCUMENTS

| | | |
|---|---|---|
| JP | 2012-238126 A | 12/2012 |
| JP | 2013-131252 A | 7/2013 |
| JP | 2013-211973 A | 10/2013 |
| JP | 2014-103788 A | 6/2014 |

* cited by examiner

IC CARD AND IC CARD SYSTEM

CROSS-REFERENCE TO RELATED APPLICATIONS

This application claims benefit of priority to International Patent Application No. PCT/JP2020/034468, filed Sep. 11, 2020, and to Japanese Patent Application No. 2020-022070, filed Feb. 13, 2020, the entire contents of each are incorporated herein by reference.

BACKGROUND

Technical Field

The present disclosure relates to an IC card including an electricity storage device and an IC card system using that IC card.

Background Art

As an example of an IC card including a secondary battery, Japanese Unexamined Patent Application Publication No. 2012-238126 describes an IC card with fingerprint authentication. That IC card includes a fingerprint reading sensor and is configured to accumulate power to be supplied from a reader in an electricity storage circuit, discharge to a device control circuit and a fingerprint processing circuit when the output voltage of the electricity storage circuit reaches a predetermined value, enable transmission/reception between itself and the reader when fingerprint authentication is successful, subsequently disable the transmission/reception between itself and the reader, and turn off the discharge to the device control circuit and the fingerprint processing circuit.

SUMMARY

As is the case in the IC card with fingerprint authentication described in Japanese Unexamined Patent Application Publication No. 2012-238126, an IC card requiring relatively high power needs an internal battery. Charging is performed at the time of obtaining inductive power from the reader. Thus, every time the IC card is used, for example, every time fingerprint authentication or the like starts, the charging is performed.

In such an IC card with a built-in battery in the related art, controls of discharging from the battery to an electronic function circuit and charging to the battery are not effectively performed with appropriate timing.

Accordingly, the present disclosure provides an IC card including an electronic function circuit that requires power in addition to a near-field communication circuit and an IC card system including the IC card, in which functionalities thereof are improved by managing and controlling presence/absence and timing of power supply from an electricity storage device to the electronic function circuit and by effectively controlling discharging of the electricity storage device and charging of the electricity storage device.

An IC card that serves as an example of the present disclosure is an IC card that communicates with a reader/writer in a non-contact manner, the reader/writer being inductive read/write communication equipment, the IC card including a proximity detection circuit that detects a proximity state to the reader/writer, a near-field communication circuit, an electronic function circuit, an electricity storage device, and a power supply control circuit. The power supply control circuit manages and controls, based on a detection result of the proximity detection circuit, presence/absence and timing of power supply from the electricity storage device to the electronic function circuit.

An IC card system that serves as an example of the present disclosure includes a reader/writer and an IC card that communicates with the reader/writer. This IC card is an IC card that communicates with the reader/writer in a non-contact manner, the reader/writer being inductive read/write communication equipment, the IC card including a proximity detection circuit that detects a proximity state to the reader/writer, a near-field communication circuit, an electronic function circuit, an electricity storage device, and a power supply control circuit. The power supply control circuit manages and controls, based on a detection result of the proximity detection circuit, presence/absence and timing of power supply from the electricity storage device to the electronic function circuit.

According to the present disclosure, an IC card including an electronic function circuit that requires power in addition to a near-field communication circuit and an IC card system including the IC card are provided, in which functionalities thereof, such as communication characteristics of the near-field communication circuit and the like, are improved by managing and controlling presence/absence and timing of power supply from an electricity storage device to the electronic function circuit and by effectively performing discharging of the electricity storage device and charging of the electricity storage device.

DETAILED DESCRIPTION

Figure 1:
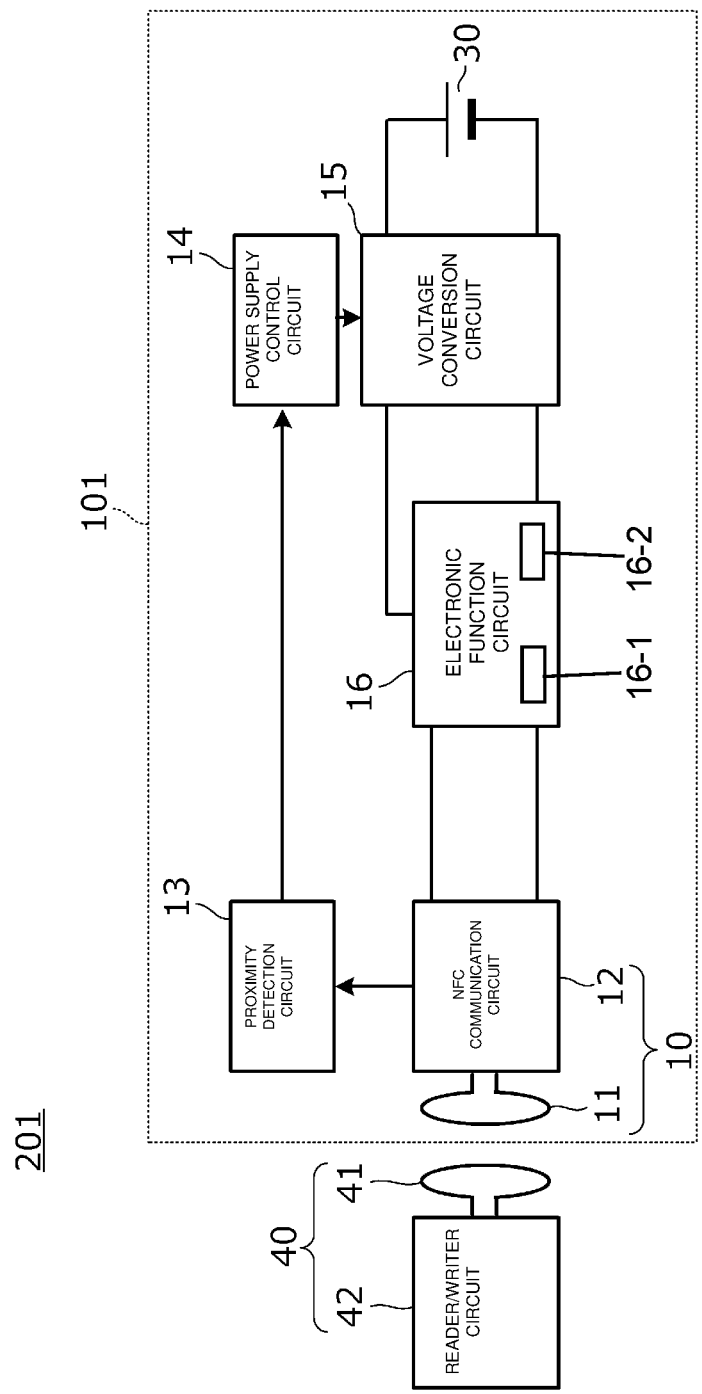
FIG. 1 is a block diagram illustrating configurations of an IC card and an IC card system according to a first embodiment.

A plurality of embodiments for implementing the present disclosure are illustrated hereinafter with several specific examples while referring to the drawings. Same reference numerals designate same parts throughout the drawings. In consideration of illustration of points and facilitation of understanding, a plurality of embodiments are described for the sake of convenience. However, constituent elements illustrated in different embodiments may be partially substituted or combined. In the description of the second embodiment and subsequent embodiments, descriptions regarding matters common to the first embodiment will not be repeated, and only points different from the first embodiment will be described. In particular, substantially same actions and effects produced by substantially same constituent elements will not be repeated in every embodiment.

First Embodiment

FIG. 1 is a block diagram illustrating configurations of an IC card 101 and an IC card system 201 according to the first embodiment. This IC card system 201 is made up of the IC card 101 and a reader/writer 40. The IC card 101 is an IC card that communicates with the reader/writer 40 in a non-contact manner. The reader/writer 40 includes a reader/writer antenna 41 and a reader/writer circuit 42.

The IC card 101 is, for example, an electronic device having the size of a credit card with a thickness of 0.76 mm. This IC card 101 is, for example, a card-size smartphone (mobile phone including a mobile operating system), an IC card for a transport system that displays balance, a one-time password card, a biometric card, or the like. The IC card 101 operates actively using an electricity storage device as a power supply or consumes quite small power of the electricity storage device during a standby period. Further, the IC card 101 operates passively without consuming power of the electricity storage device.

The IC card 101 includes a proximity detection circuit 13 that detects a proximity state to the reader/writer 40, a near-field communication circuit 10, an electricity storage device 30, a power supply control circuit 14, a voltage conversion circuit 15, and an electronic function circuit 16. The near-field communication circuit 10 is made up of an NFC coil 11 and an NFC communication circuit 12. Here, the NFC coil 11 corresponds to a "near-field communication coil" according to the present disclosure, and the NFC communication circuit 12 corresponds to a "communication circuit" according to the present disclosure. The electricity storage device 30 is, for example, a secondary battery, such as a lithium ion battery, an all solid state battery, or the like, or a capacitor, such as a super capacitor (electric double layer capacitor) or the like. The voltage conversion circuit 15 converts the voltage of the electricity storage device 30 into a predetermined voltage and supplies the converted voltage to the electronic function circuit 16 as a power supply voltage.

The NFC coil 11 magnetically couples with the reader/writer antenna 41, an induced current flows in the NFC coil 11, and a voltage is induced. This changes the voltage inside the NFC communication circuit 12. The proximity detection circuit 13 receives this voltage inside the NFC communication circuit 12 as input and detects the state where the input exceeds a predetermined voltage as the "proximity state".

The power supply control circuit 14 controls, based on the detection result of the proximity detection circuit 13, power supply from the electricity storage device 30 to the electronic function circuit 16. That is to say, the power supply control circuit 14 enables, based on a detection signal of "proximity state" of the proximity detection circuit 13, a voltage conversion operation of the voltage conversion circuit 15. Because of this, the electronic function circuit 16 performs a predetermined operation.

The electronic function circuit 16 is a circuit for implementing various functions other than NFC communication. For example, the electronic function circuit 16 includes a fingerprint reader sensor 16-1 and a processor 16-2 (e.g., collectively referred to as a "fingerprint authorization circuit") that performs a fingerprint authentication process. The NFC communication circuit 12 communicates with the reader/writer circuit 42. The communication of the NFC communication circuit 12 is enabled when the electronic function circuit 16 detects, by fingerprint authentication, that a user of the IC card 101 is the user who is supposed to communicate.

When a user brings the IC card 101 in close proximity to the reader/writer 40, the power supply control circuit 14 enables the voltage conversion operation of the voltage conversion circuit 15. This enables the electronic function circuit 16 to operate using the electricity storage device 30 as a power supply (using the voltage converted by the voltage conversion circuit 15 as the power supply). Further, when the fingerprint authentication is successful, communication is performed using the NFC communication circuit 12.

In the state where a user does not bring the IC card 101 in close proximity to the reader/writer 40, the power supply control circuit 14 disables the voltage conversion operation of the voltage conversion circuit 15. Accordingly, no wasteful power is consumed in the voltage conversion circuit 15 and the electronic function circuit 16.

Note that in the present embodiment, the power supply control circuit 14 operates using a voltage signal output from the proximity detection circuit 13, and further the proximity detection circuit 13 operates using a voltage generated in the NFC communication circuit 12. Thus, in the state where the IC card 101 is away from the reader/writer 40, there is no consumption of the electricity storage device 30 by the power supply control circuit 14.

According to the present embodiment, the consumption of the electricity storage device 30 is kept to a minimum at the time of not using the IC card 101.

Second Embodiment

In the second embodiment, there are illustrated examples of an IC card, which includes a wireless power reception circuit and a circuit for charging a secondary battery, and an IC card system.

Figure 2:
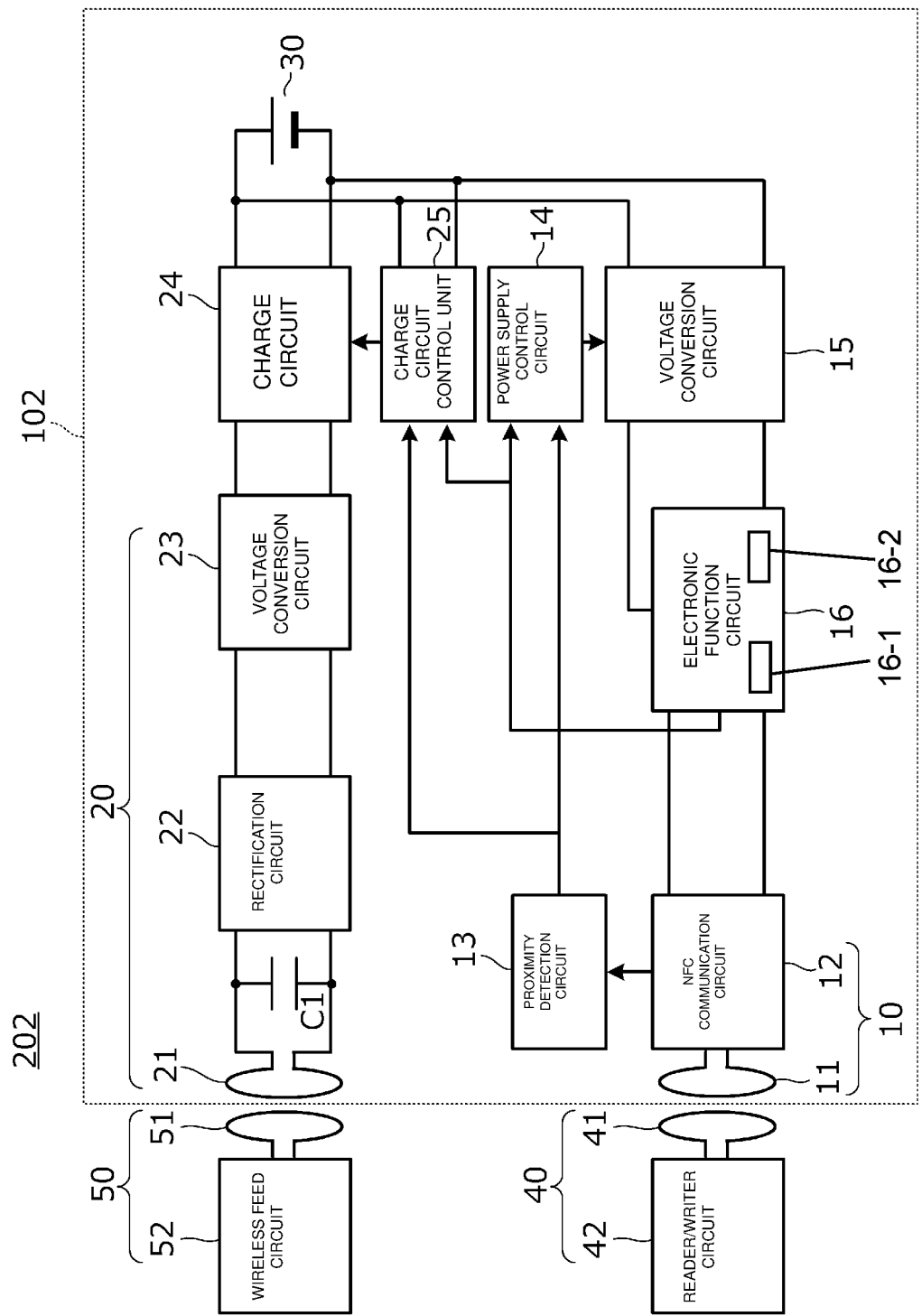
FIG. 2 is a block diagram illustrating configurations of an IC card and an IC card system according to a second embodiment.

FIG. 2 is a block diagram illustrating configurations of an IC card 102 and an IC card system 202 according to the second embodiment. This IC card system 202 is made up of the IC card 102, the reader/writer 40, and a wireless feed device 50. The IC card 102 is an IC card that receives power wirelessly from the wireless feed device 50 and communicates with the reader/writer 40 in a non-contact manner. The wireless feed device 50 includes a wireless power transmission coil 51 and a wireless feed circuit 52. The reader/writer 40 includes the reader/writer antenna 41 and the reader/writer circuit 42.

The IC card 102 includes the proximity detection circuit 13 that detects a proximity state to the reader/writer 40, the near-field communication circuit 10, the electricity storage device 30, the power supply control circuit 14, the voltage conversion circuit 15, and the electronic function circuit 16. The near-field communication circuit 10 is made up of the NFC coil 11 and the NFC communication circuit 12. Here, the NFC coil 11 corresponds to the "near-field communication coil" according to the present disclosure, and the NFC communication circuit 12 corresponds to the "communication circuit" according to the present disclosure. The voltage conversion circuit 15 converts the voltage of the electricity storage device 30 into a predetermined voltage and supplies the converted voltage to the electronic function circuit 16 as power supply voltage.

Further, the IC card 102 includes a wireless power reception circuit 20 that receives power wirelessly from outside, a charge circuit 24 that charges the electricity storage device 30, and a charge circuit control unit 25. The charge circuit control unit 25 controls the charge circuit 24 after a lapse of a predetermined time from the detection of the "proximity state" by the proximity detection circuit 13 or based on a notification signal from the electronic function circuit 16. The charge circuit 24 and the charge circuit control unit 25 correspond to a "charge control circuit" according to the present disclosure.

In the present embodiment, the wireless feed device 50 and the reader/writer 40 are provided in the same device. That is to say, in the state where the NFC coil 11 magnetically couples with the reader/writer antenna 41, a wireless power reception coil 21 magnetically couples with the wireless power transmission coil 51.

The wireless power transmission coil 51 magnetically couples with the wireless power reception coil 21, and power is fed wirelessly from the wireless feed circuit 52 to the wireless power reception circuit 20. The wireless power reception coil 21 and a capacitor C1 constitute a parallel resonant circuit, and a rectification circuit 22 rectifies the resonant voltage of this parallel resonant circuit. A voltage conversion circuit 23 converts the output voltage of the rectification circuit 22 into a predetermined voltage. The charge circuit 24 charges the electricity storage device 30 by using the output voltage of the voltage conversion circuit 23 as power supply. The charge circuit control unit 25 controls to enable/disable the operation of the charge circuit 24.

The working caused by the configuration different from that of the example illustrated in FIG. 1 in the first embodiment is as follows. First, after completion of a predetermined operation, the electronic function circuit 16 outputs a notification signal thereof to the charge circuit control unit 25. Upon receipt of that notification signal from the electronic function circuit 16, the charge circuit control unit 25 starts the charging of the electricity storage device 30 using the charge circuit 24.

Further, the charge circuit control unit 25 starts the charging of the electricity storage device 30 using the charge circuit 24 after a lapse of a predetermined time from the detection of the "proximity state" by the proximity detection circuit 13.

Moreover, the charge circuit control unit 25 detects the voltage of the electricity storage device 30 and detects whether the electricity storage device 30 reaches a fully charged state.

Figure 3:
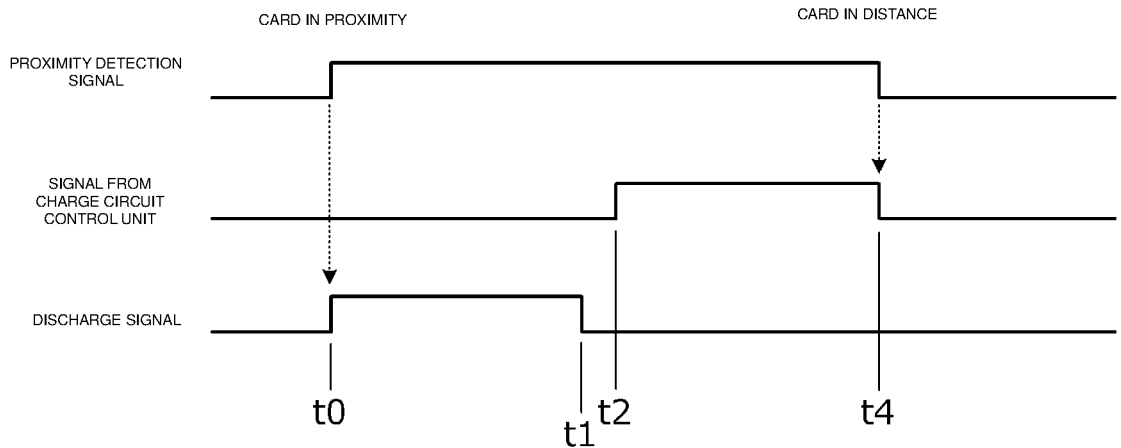
FIG. 3 is a time chart illustrating operations of respective units of the IC card associated with a near/far position change of the IC card relative to a reader/writer.

FIG. 3 is a time chart illustrating operations of respective units of the IC card 102 associated with a near/far position change of the IC card 102 relative to the reader/writer 40. When the IC card 102 is brought in close proximity to the reader/writer 40 and the wireless feed device 50 at the timing t0 illustrated in FIG. 3, the proximity detection circuit 13 detects that the IC card 102 is in close proximity to the reader/writer 40 and the wireless feed device 50, and the power supply control circuit 14 enables the operation of the voltage conversion circuit 15. This causes the electricity storage device 30 to discharge, and the operation of the electronic function circuit 16 starts. This is indicated by the "discharge signal" in FIG. 3. In this example, the operation time of the electronic function circuit 16 is a constant and ends at t1 after a lapse of a constant time from t0. At t2 or after a lapse of a constant time from t0, the charge circuit control unit 25 enables the charge circuit 24 and starts the charging of the electricity storage device 30.

Subsequently, when the IC card 102 is brought away from the reader/writer 40 at the timing t4, the charge circuit control unit 25 disables the charge circuit 24 (disconnects the charge circuit 24 from the electricity storage device 30).

Figure 4:
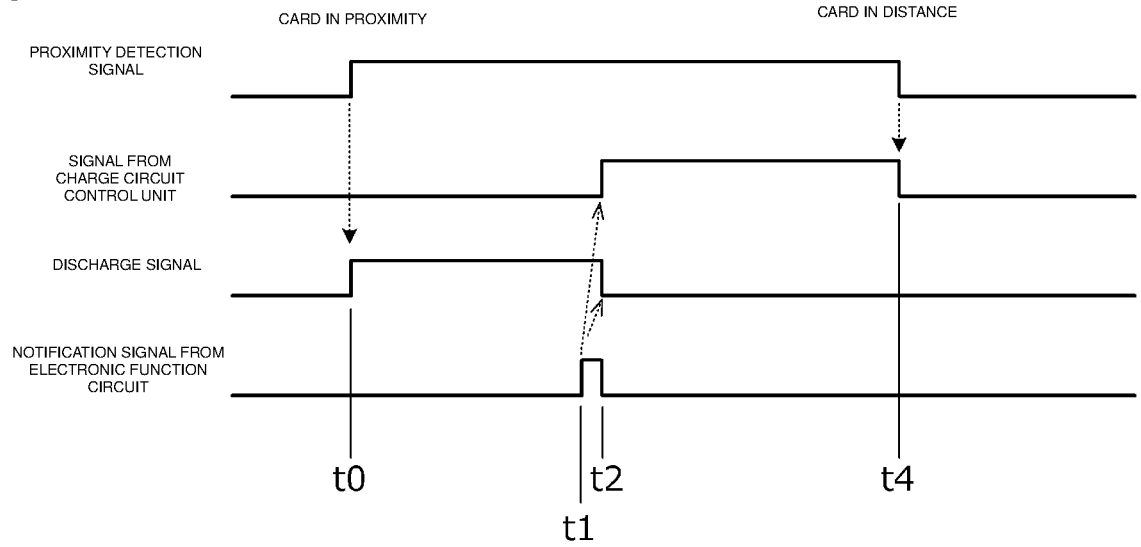
FIG. 4 is a time chart illustrating operations of respective units of the IC card associated with the near/far position change of the IC card relative to the reader/writer and is another example different from the example illustrated in FIG. 3.

FIG. 4 is a time chart illustrating operations of respective units of the IC card 102 associated with the near/far position change of the IC card 102 relative to the reader/writer 40 and is another example different from the example illustrated in FIG. 3. When the IC card 102 is brought in close proximity to the reader/writer 40 and the wireless feed device 50 at the timing t0 illustrated in FIG. 4, the proximity detection circuit 13 detects that the IC card 102 is in close proximity to the reader/writer 40 and the wireless feed device 50, and the power supply control circuit 14 enables the operation of the voltage conversion circuit 15. This causes the electricity storage device 30 to discharge, and the operation of the electronic function circuit 16 starts. This is indicated by the "discharge signal" in FIG. 4. For example, when the electronic function circuit 16 completes a predetermined operation at t1, the notification signal from the electronic function circuit 16 causes the charge circuit control unit 25 to enable the charge circuit 24 and start the charging of the electricity storage device 30 at the timing t2. Further, the notification signal from the electronic function circuit 16 causes the power supply control circuit 14 to stop a conversion operation of the voltage conversion circuit 15.

Subsequently, when the IC card 102 is brought away from the reader/writer 40 at the timing t4, the charge circuit control unit 25 disables the charge circuit 24 (disconnects the charge circuit 24 from the electricity storage device 30).

Figure 5:
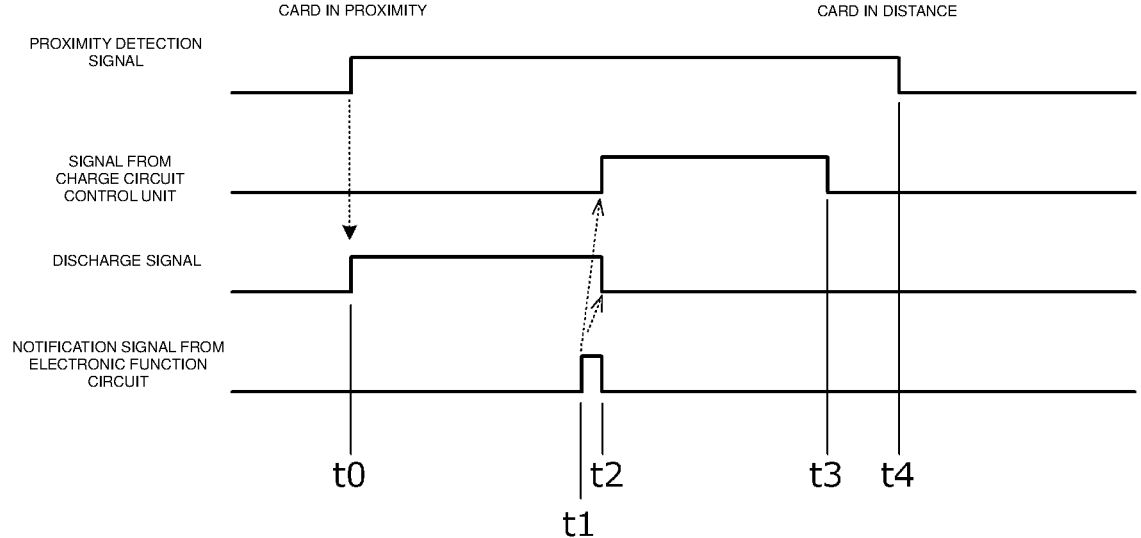
FIG. 5 is another time chart illustrating operations of respective units of the IC card associated with the near/far position change of the IC card relative to the reader/writer and is another example different from the examples illustrated in FIG. 3 and FIG. 4.

FIG. 5 is another time chart illustrating operations of respective units of the IC card 102 associated with the near/far position change of the IC card 102 relative to the reader/writer 40 and is another example different from the examples illustrated in FIG. 3 and FIG. 4. When the IC card 102 is brought in close proximity to the reader/writer 40 and the wireless feed device 50 at the timing t0 illustrated in FIG. 5, the proximity detection circuit 13 detects that the IC card 102 is in close proximity to the reader/writer 40 and the wireless feed device 50, and the power supply control circuit 14 enables the operation of the voltage conversion circuit 15. This causes the electricity storage device 30 to discharge, and the operation of the electronic function circuit 16 starts. When the electronic function circuit 16 completes a predetermined operation at t1, the notification signal from the electronic function circuit 16 causes the charge circuit control unit 25 to enable the charge circuit 24 and start the charging of the electricity storage device 30 at the timing t2. Further, the notification signal from the electronic function circuit 16 causes the power supply control circuit 14 to stop the conversion operation of the voltage conversion circuit 15. Subsequently, at the timing t3, when the charge circuit control unit 25 detects the voltage of the electricity storage device 30 and detects that the electricity storage device 30 reaches the fully charged state, the charge circuit control unit 25 stops the charging being performed by the charge circuit 24. Subsequently, at the timing t4, the IC card 102 is brought away from the reader/writer 40.

As described above, the charging may also be started by the notification signal from the electronic function circuit 16. According to the controls illustrated in FIG. 3, FIG. 4, and FIG. 5, the charging of the electricity storage device 30 starts after the completion of operation of the electronic function circuit 16. Thus, it becomes possible to avoid the case where the charging of the electricity storage device 30 starts immediately after the IC card 102 is brought in close proximity to the reader/writer 40, and this prevents a decrease in the power supply voltage to be supplied to the electronic function circuit 16 due to the charging of the electricity storage device 30. Accordingly, this prevents flaws, such as, for example, the case where the electronic function circuit 16 cannot be activated until the voltage of the electricity storage device 30 increases to a predetermined voltage.

Further, bringing the IC card 102 away from the reader/writer 40 causes the charge circuit control unit 25 to disconnect the charge circuit 24 from the electricity storage device 30, and this suppresses wasteful power consumption of the electricity storage device 30.

Third Embodiment

In the third embodiment, there is illustrated an example of the IC card in which the electronic function circuit operates independently from the NFC communication circuit.

Figure 6:
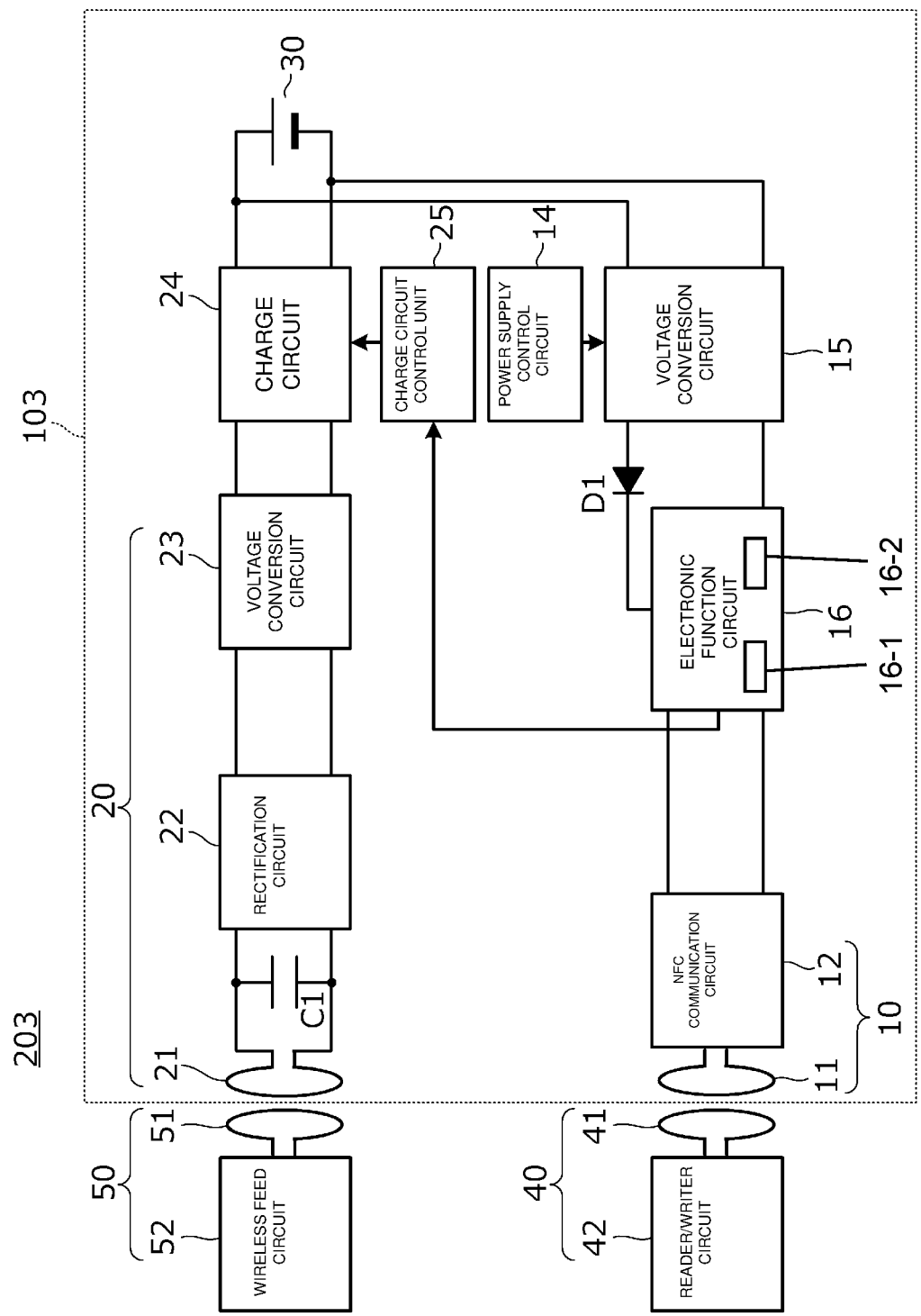
FIG. 6 is a block diagram illustrating configurations of an IC card and an IC card system according to a third embodiment.

FIG. 6 is a block diagram illustrating configurations of an IC card 103 and an IC card system 203 according to the third embodiment. This IC card system 203 is made up of the IC card 103, the reader/writer 40, and the wireless feed device 50.

The IC card 103 includes the near-field communication circuit 10, the electricity storage device 30, the power supply control circuit 14, the voltage conversion circuit 15, the electronic function circuit 16, the wireless power reception circuit 20, the charge circuit 24, and the charge circuit control unit 25. The basic operation of each of the units is as described in the second embodiment. In the present embodiment, a backflow prevention diode D1 is inserted between the voltage conversion circuit 15 and a power line of the electronic function circuit 16.

Figure 7:
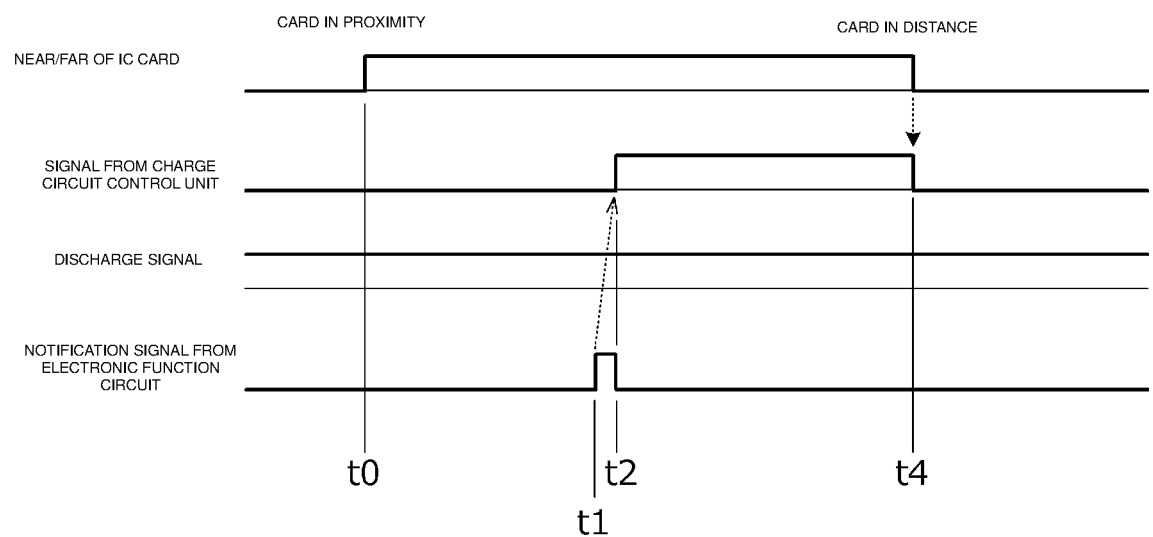
FIG. 7 is a time chart illustrating operations of respective units of the IC card associated with the near/far position change of the IC card relative to the reader/writer.

FIG. 7 is a time chart illustrating operations of respective units of the IC card 103 associated with the near/far position change of the IC card 103 relative to the reader/writer 40. In the example illustrated in FIG. 7, a power supply voltage is constantly supplied to the electronic function circuit 16 from the electricity storage device 30.

When the IC card 103 is brought in close proximity to the reader/writer 40 at the timing t0 illustrated in FIG. 7, the NFC communication circuit 12 performs predetermined NFC communication. Further, when the electronic function circuit 16 completes a predetermined operation at the timing t1, the notification signal from the electronic function circuit 16 causes the charge circuit control unit 25 to enable the charge circuit 24 and start the charging of the electricity storage device 30 at the timing t2. Subsequently, when the IC card 103 is brought away from the reader/writer 40 at the timing t4, no power is received from the wireless power reception circuit 20, and thus the charging of the electricity storage device 30 inevitably ends.

The IC card 103 of the present embodiment is effective when the electronic function circuit 16 operates continuously in the state where the IC card 103 receives power wirelessly.

Note that the backflow prevention diode D1 is inserted between the voltage conversion circuit 15 and the power line of the electronic function circuit 16. Thus, even when the voltage of the electricity storage device 30 becomes lower than the voltage of the power line of the electronic function circuit 16, if the operation of the electronic function circuit 16 is stopped, the voltage of the power line of the electronic function circuit 16 does not decrease rapidly, and the charge voltage of a capacitor connected to the power line inside the electronic function circuit 16 is maintained. This enables the electronic function circuit 16 to promptly start operation at the time of a subsequent operation.

According to the present embodiment, the charging of the electricity storage device 30 is not performed during a period of NFC communication, which is performed using the NFC communication circuit 12. That is to say, the subsequent stage of the resonant circuit made up of the wireless power reception coil 21 and the capacitor C1 is virtually disconnected, and thus coupling of the NFC coil 11 and the wireless power reception coil 21 can suppress a decrease in the impedance looking from between terminals of the NFC coil 11 and further suppress a decrease in the impedance looking from between terminals of the reader/writer antenna 41. Because of this, it becomes possible to suppress a decrease in intensity of an NFC communication signal during a period of NFC communication.

Further, the first embodiment and the second embodiment also produce substantially same actions and effects. During a period of NFC communication performed using the NFC communication circuit 12, the charging of the electricity storage device 30 is not performed, and it becomes possible to suppress a decrease in the impedance looking from between terminals of the NFC coil 11 and further suppress a decrease in the impedance looking from between terminals of the reader/writer antenna 41. Particularly, because the IC card systems 201, 203, 204, and 206 each have the configuration in which the charging is performed using the NFC coil 11, the IC card systems 201, 203, 204, and 206 are particularly effective.

Fourth Embodiment

In the fourth embodiment, there is illustrated an example in which an NFC coil is used for receiving power wirelessly and the charging of a secondary battery is performed using that power.

Figure 8:
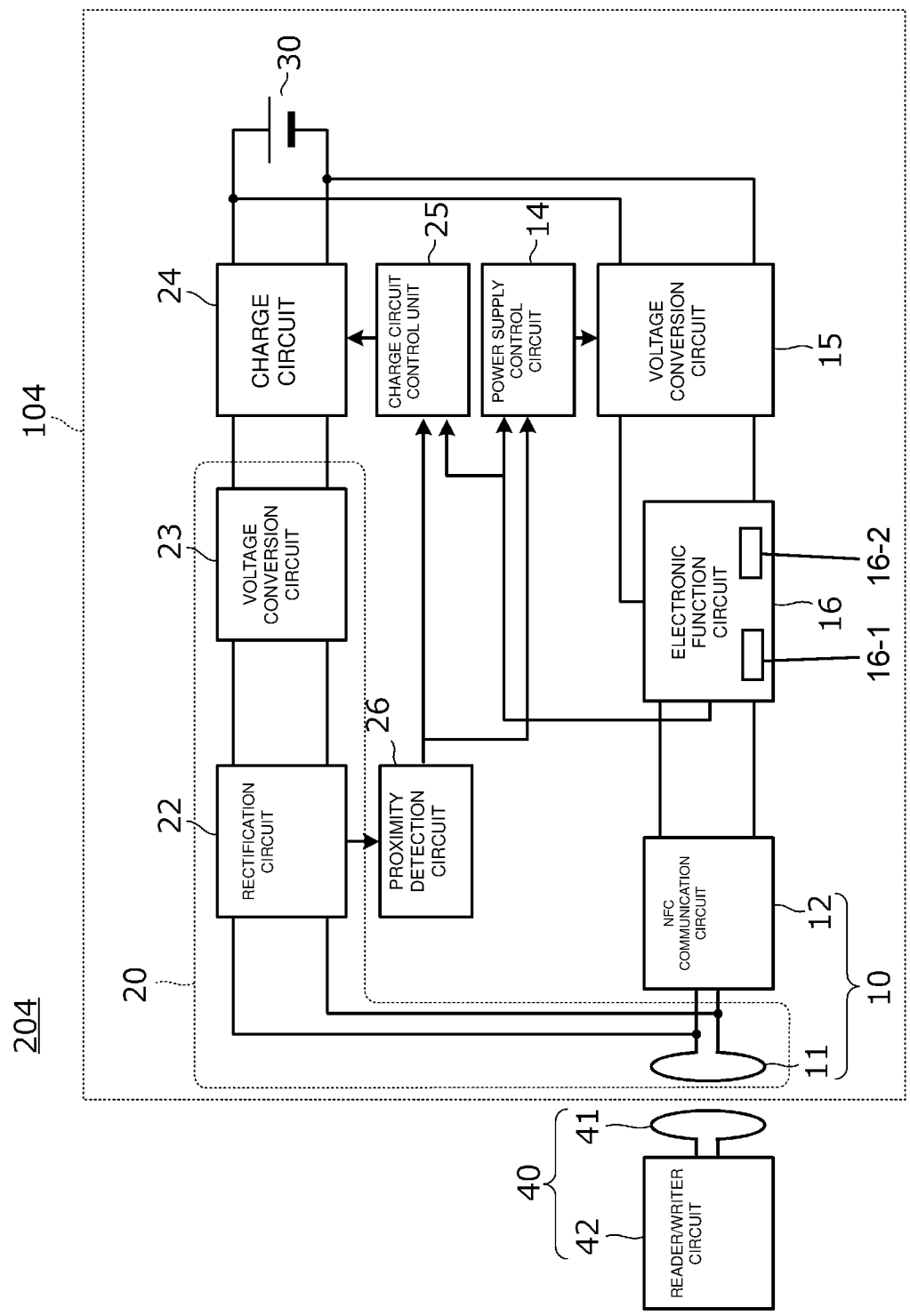
FIG. 8 is a block diagram illustrating configurations of an IC card and an IC card system according to a fourth embodiment.

FIG. 8 is a block diagram illustrating configurations of an IC card 104 and an IC card system 204 according to the fourth embodiment. This IC card system 204 is made up of the IC card 104 and the reader/writer 40. The IC card 104 is an IC card that communicates with the reader/writer 40 in a non-contact manner and is an IC card that receives power wirelessly from the reader/writer 40. The reader/writer 40 includes the reader/writer antenna 41 and the reader/writer circuit 42.

The IC card 104 includes the near-field communication circuit 10, the electricity storage device 30, the power supply control circuit 14, the voltage conversion circuit 15, the electronic function circuit 16, the rectification circuit 22, the voltage conversion circuit 23, the charge circuit 24, the charge circuit control unit 25, and a proximity detection circuit 26.

The NFC coil 11, the rectification circuit 22, and the voltage conversion circuit 23 constitute the wireless power reception circuit 20. The proximity detection circuit 26 detects, based on the output voltage of the rectification circuit 22, the proximity state of the IC card 104 relative to the reader/writer 40 and outputs a detection signal to the charge circuit control unit 25 and the power supply control circuit 14. The basic operation of each of the units other than the above is as described in the second embodiment.

The present embodiment enables the NFC coil 11 to receive wireless power generated from the reader/writer circuit 42 and enables the charging of the electricity storage device 30 by using that power.

Fifth Embodiment

In the fifth embodiment, there is illustrated an example of the IC card, in which the operation of the electronic function circuit is controlled in accordance with the voltage of the electricity storage device.

Figure 9:
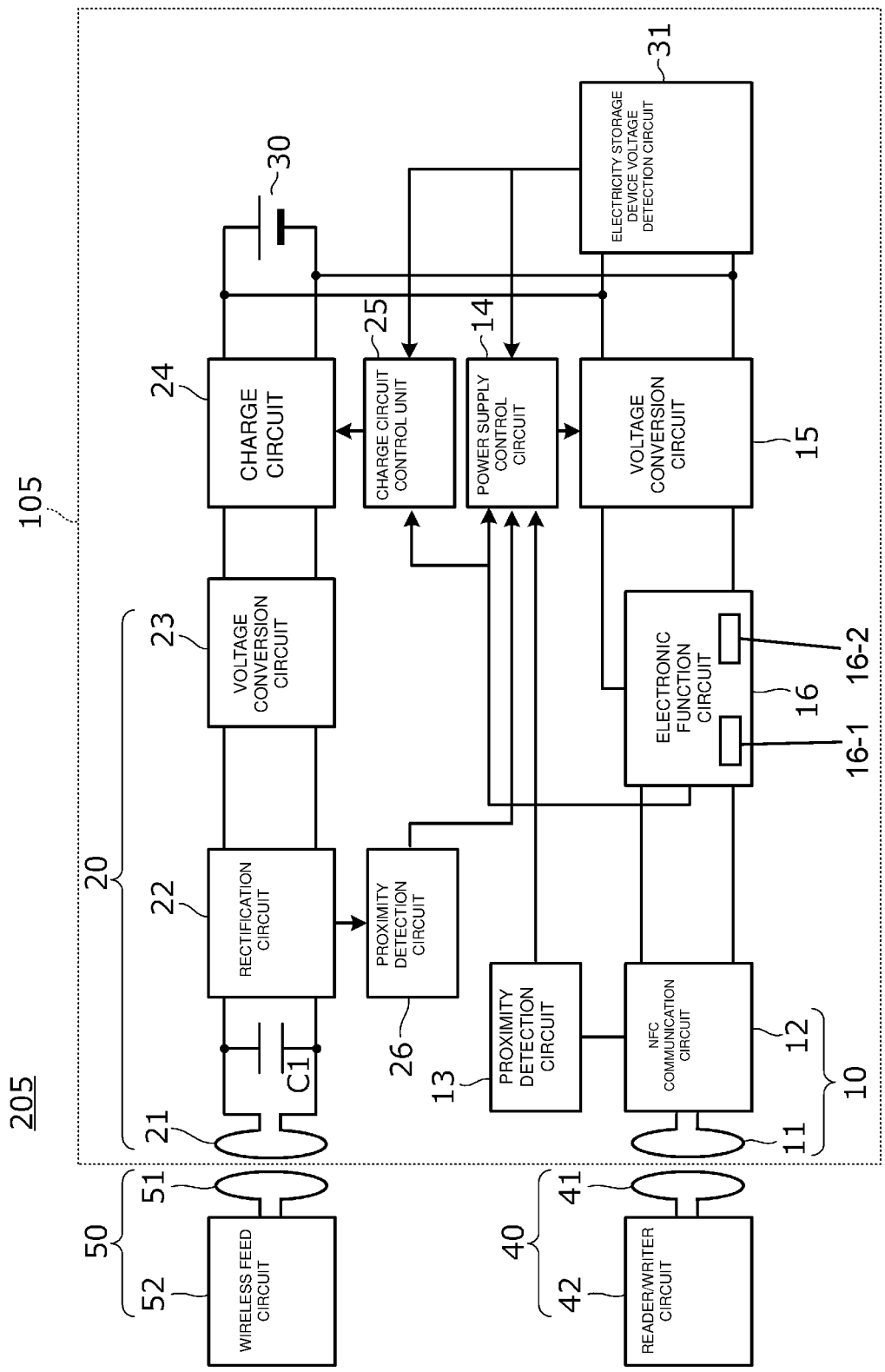
FIG. 9 is a block diagram illustrating configurations of an IC card and an IC card system according to a fifth embodiment.

FIG. 9 is a block diagram illustrating configurations of an IC card 105 and an IC card system 205 according to the fifth embodiment. This IC card system 205 is made up of the IC card 105, the reader/writer 40, and the wireless feed device 50.

The IC card 105 includes the near-field communication circuit 10, the proximity detection circuit 13, the electricity storage device 30, the power supply control circuit 14, the voltage conversion circuit 15, the electronic function circuit 16, the wireless power reception circuit 20, the charge circuit 24, the charge circuit control unit 25, the proximity detection circuit 26, and an electricity storage device voltage detection circuit 31.

The proximity detection circuit 26 detects, based on a rectified output voltage of the rectification circuit 22, the proximity state of the IC card 105 relative to the wireless power transmission coil 51. The electricity storage device voltage detection circuit 31 detects the voltage of the electricity storage device 30. When the voltage of the electricity storage device 30 is detected as being in a low voltage state, the electricity storage device voltage detection circuit 31 sends a detection signal thereof to the power supply control circuit 14 and the charge circuit control unit 25. Upon receipt of that detection signal, the power supply control circuit 14 disables the voltage conversion circuit 15 and cuts off the power supply to the electronic function circuit 16. Further, upon receipt of the foregoing case signal, the charge circuit control unit 25 causes the charge circuit 24 to operate and starts the charging of the electricity storage device 30. That is to say, the electricity storage device voltage detection circuit 31 detects whether the voltage of the electricity storage device 30 is in a predetermined low voltage state, and when the voltage of the electricity storage device 30 is in the predetermined low voltage state, the electricity storage device voltage detection circuit 31 stops operation of the electronic function circuit 16 and causes the charge circuit 24 to charge the electricity storage device 30.

Further, in FIG. 9, the electronic function circuit 16 has plural kinds of functions. The electricity storage device voltage detection circuit 31 detects whether the voltage of the electricity storage device 30 is in a predetermined low voltage state, and when the voltage of the electricity storage device 30 is in the predetermined low voltage state, the electricity storage device voltage detection circuit 31 restricts the functions of the electronic function circuit 16.

The basic operation of each of the units other than the above is as described in the previous embodiments.

According to the present embodiment, when the voltage of the electricity storage device 30 is in the low voltage state where charging is necessary, the power consumption of the electricity storage device 30 is suppressed by stopping or restricting the operation of the electronic function circuit 16. Thus, it becomes possible to prevent over-discharging of the electricity storage device 30, and this enables prompt charging afterward. Further, in the state where the remaining of the stored power of the electricity storage device 30 is low, the electronic function circuit 16 operates while their functions are being restricted, and thus a substantive use time of the electricity storage device 30 is extended.

Sixth Embodiment

In the sixth embodiment, there are illustrated examples of the IC card and the IC card system. The IC card includes the wireless power reception circuit and receives wireless power from the reader/writer.

Figure 10:
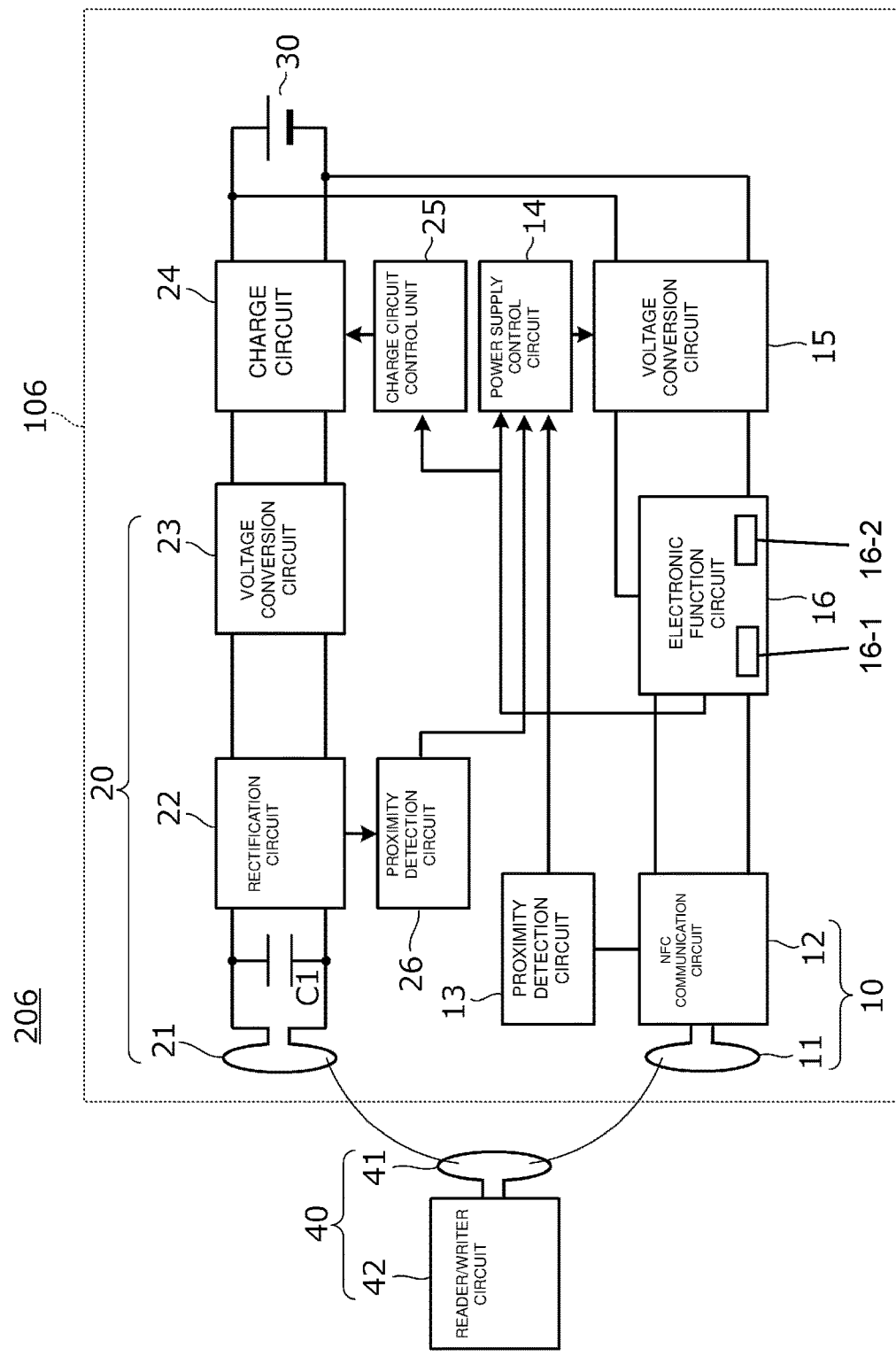
FIG. 10 is a block diagram illustrating configurations of an IC card and an IC card system according to a sixth embodiment.

FIG. 10 is a block diagram illustrating configurations of an IC card 106 and an IC card system 206 according to the sixth embodiment. This IC card system 206 is made up of the IC card 106 and the reader/writer 40.

The IC card 106 includes the near-field communication circuit 10, the proximity detection circuit 13, the electricity storage device 30, the power supply control circuit 14, the voltage conversion circuit 15, the electronic function circuit 16, the wireless power reception circuit 20, the charge circuit 24, the charge circuit control unit 25, and the proximity detection circuit 26.

The wireless power reception circuit 20 is made up of the wireless power reception coil 21, the capacitor C1, the rectification circuit 22, and the voltage conversion circuit 23. The wireless power reception coil 21 magnetically couples with the reader/writer antenna 41 of the reader/writer 40 and receives power wirelessly.

The near-field communication circuit 10 is made up of the NFC coil 11 and the NFC communication circuit 12, the NFC coil 11 magnetically couples with the reader/writer antenna 41, and the NFC communication circuit 12 performs NFC communication with the reader/writer circuit 42.

The basic operation of each of the units other than the above is as described in the previous embodiments.

According to the present embodiment, it becomes possible to perform the wireless power reception and the near-field communication through the coupling with the reader/writer 40.

Lastly, the foregoing descriptions of the embodiments are exemplary in all aspects and are not restrictive. For a person skilled in the art, modifications and alterations are possible if appropriate. The scope of the present disclosure is described by the claims and not by the foregoing embodiments. Furthermore, variations of the embodiments, which come within the scope of the claims and the range of equivalency of the claims, are included in the scope of the present disclosure.

What is claimed is:

1. An IC card that communicates with a reader/writer in a non-contact manner, the reader/writer being inductive read/write communication equipment, the IC card comprising:
   a proximity detection circuit configured to detect a proximity state to the reader/writer;
   a near-field communication circuit;
   an electronic function circuit;
   an electricity storage device including a secondary battery or a super capacitor;
   a charge control circuit configured to charge the electricity storage device; and
   a power supply control circuit configured to manage and control, based on a detection result of the proximity detection circuit, presence/absence and timing of power supply from the electricity storage device to the electronic function circuit, upon receipt of a notification signal from the electronic function circuit after a detection of the proximity state by the proximity detection circuit, the power supply control circuit starts charging of the electricity storage device using the charge control circuit, and determining to enable or disable the near-field communication circuit based on a result of authentication by the electronic function circuit, and only when the near-field communication circuit is determined to be enabled, power is supplied from the electricity storage device to the near-field communication circuit through the electronic function circuit.

2. The IC card according to claim 1, wherein the power supply control circuit is configured to start charging of the electricity storage device using the charge control circuit after a lapse of a predetermined time from the detection of the proximity state by the proximity detection circuit.

3. The IC card according to claim 2, wherein the near-field communication circuit includes a near-field communication coil and a communication circuit electrically connected to the near-field communication coil, and power input to the charge control circuit is supplied from the reader/writer via the near-field communication coil.

4. The IC card according to claim 3, wherein the proximity detection circuit is configured to detect the proximity state based on a voltage generated inside the communication circuit.

5. The IC card according to claim 3, further comprising: an electricity storage device voltage detection circuit that is configured to detect whether a voltage of the electricity storage device is in a low voltage state, the low voltage state being a state where the voltage of the electricity storage device is lower than or equal to a predetermined voltage, and that is configured to stop operation of the electronic function circuit and charge the electricity storage device by using the charge control circuit when the voltage of the electricity storage device is in the low voltage state.

6. The IC card according to claim 3, further comprising: an electricity storage device voltage detection circuit, wherein the electronic function circuit has a plurality of functions, and the electricity storage device voltage detection circuit is configured to detect whether a voltage of the electricity storage device is in a low voltage state, the low voltage state being a state where the voltage of the electricity storage device is lower than or equal to a predetermined voltage, and is configured to stop one or more of the plurality of functions of the electronic function circuit to restrict the one or more of the plurality of functions when the voltage of the electricity storage device is in the low voltage state.

7. The IC card according to claim 2, further comprising: an electricity storage device voltage detection circuit that is configured to detect whether a voltage of the electricity storage device is in a low voltage state, the low voltage state being a state where the voltage of the electricity storage device is lower than or equal to a predetermined voltage, and that is configured to stop operation of the electronic function circuit and charge the electricity storage device by using the charge control circuit when the voltage of the electricity storage device is in the low voltage state.

8. The IC card according to claim 2, further comprising: an electricity storage device voltage detection circuit, wherein the electronic function circuit has a plurality of functions, and the electricity storage device voltage detection circuit is configured to detect whether a voltage of the electricity storage device is in a low voltage state, the low voltage state being a state where the voltage of the electricity storage device is lower than or equal to a predetermined voltage, and is configured to stop one or more of the plurality of functions of the electronic function circuit to restrict the one or more of the plurality of functions when the voltage of the electricity storage device is in the low voltage state.

9. The IC card according to claim 2, further comprising: a wireless power reception coil configured to wirelessly receive power from outside, wherein the reader/writer is configured to supply, via the wireless power reception coil, power input to the charge control circuit.

10. The IC card according to claim 9, wherein the proximity detection circuit is configured to detect the proximity state based on a voltage of the wireless power reception coil.

11. An IC card system comprising:
the IC card according to claim 10;
a wireless feed device including a wireless power transmission coil configured to couple with the wireless power reception coil of the IC card by using an electromagnetic field; and
the reader/writer which is configured to communicate with the IC card.

12. An IC card system comprising:
the IC card according to claim 9;
a wireless feed device including a wireless power transmission coil configured to couple with the wireless power reception coil of the IC card by using an electromagnetic field; and
the reader/writer which is configured to communicate with the IC card.

13. An IC card system comprising:
the IC card according to claim 2; and
the reader/writer that communicates with the IC card.

14. The IC card according to claim 1, wherein the electronic function circuit configured to determine the result of authentication further includes a fingerprint authorization circuit configured to perform fingerprint authentication, and the near-field communication circuit is enabled for communication when the fingerprint authorization circuit determines, by the fingerprint authentication, authorization of a user to use the IC card.

15. The IC card according to claim 1, wherein the power supply control circuit is configured to stop, based on another notification signal from the electronic function circuit after the detection of the proximity state by the proximity detection circuit, charging of the electricity storage device being performed by the charge control circuit.

16. The IC card according to claim 15, wherein the near-field communication circuit includes a near-field communication coil and a communication circuit electrically connected to the near-field communication coil, and power input to the charge control circuit is supplied from the reader/writer via the near-field communication coil.

17. The IC card according to claim 15, further comprising:
an electricity storage device voltage detection circuit that is configured to detect whether a voltage of the electricity storage device is in a low voltage state, the low voltage state being a state where the voltage of the electricity storage device is lower than or equal to a predetermined voltage, and that is configured to stop operation of the electronic function circuit and charge the electricity storage device by using the charge control circuit when the voltage of the electricity storage device is in the low voltage state.

18. The IC card according to claim 15, further comprising:
an electricity storage device voltage detection circuit, wherein
the electronic function circuit has a plurality of functions, and
the electricity storage device voltage detection circuit is configured to detect whether a voltage of the electricity storage device is in a low voltage state, the low voltage state being a state where the voltage of the electricity storage device is lower than or equal to a predetermined voltage, and is configured to stop one or more of the plurality of functions of the electronic function circuit to restrict the one or more of the plurality of functions when the voltage of the electricity storage device is in the low voltage state.

19. The IC card according to claim 15, further comprising:
a wireless power reception coil configured to wirelessly receive power from outside, wherein
the reader/writer is configured to supply, via the wireless power reception coil, power input to the charge control circuit.

20. An IC card system comprising:
the IC card according to claim 1; and
the reader/writer that communicates with the IC card.

* * * * *